United States Patent
Asano et al.

(10) Patent No.: US 6,879,938 B2
(45) Date of Patent: Apr. 12, 2005

(54) TIRE BURST PREDICTION DEVICE

(75) Inventors: Katsuhiro Asano, Aichi-gun (JP);
Eiichi Ono, Aichi-gun (JP); Takaji Umeno, Aichi-gun (JP); Hideki Ohashi, Toyota (JP); Kazuhiro Kamiya, Anjo (JP); Yukio Mori, Nagoya (JP); Toshiharu Naito, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 10/380,108

(22) PCT Filed: Oct. 12, 2001

(86) PCT No.: PCT/JP01/08963
§ 371 (c)(1),
(2), (4) Date: Apr. 14, 2003

(87) PCT Pub. No.: WO02/32698
PCT Pub. Date: Apr. 25, 2002

(65) Prior Publication Data
US 2004/0015312 A1 Jan. 22, 2004

(30) Foreign Application Priority Data
Oct. 13, 2000 (JP) ........................................ 2000-314400

(51) Int. Cl.$^7$ ............................................. G06F 19/00
(52) U.S. Cl. .................... 702/185; 702/56; 702/145; 702/147; 73/146; 701/70; 340/426.33
(58) Field of Search ............................ 702/185, 41, 56, 702/145, 147, 148; 73/146; 701/70, 71, 72, 73, 76, 82, 92; 390/426.33

(56) References Cited

U.S. PATENT DOCUMENTS

| | | | |
|---|---|---|---|
| 5,753,809 A | 5/1998 | Ogusu et al. | |
| 5,844,475 A * | 12/1998 | Horie | 340/442 |
| 5,913,241 A | 6/1999 | Ohashi et al. | |
| 5,936,519 A * | 8/1999 | Nakajima et al. | 340/444 |
| 6,014,599 A | 1/2000 | Inoue et al. | |
| 6,092,028 A * | 7/2000 | Naito et al. | 702/47 |
| 6,142,026 A | 11/2000 | Ohashi et al. | |
| 6,264,292 B1 * | 7/2001 | Umeno et al. | 303/196 |
| 6,285,280 B1 | 9/2001 | Wang | |
| 6,324,461 B1 * | 11/2001 | Yamaguchi et al. | 701/80 |

(Continued)

FOREIGN PATENT DOCUMENTS

| | | |
|---|---|---|
| EP | 1 085 312 A2 | 3/2001 |
| EP | 1 097 850 A2 | 5/2001 |
| JP | A 6-211012 | 8/1994 |
| JP | A 6-297923 | 10/1994 |
| JP | A 7-149123 | 6/1995 |

(Continued)

*Primary Examiner*—Patrick Assouad
(74) *Attorney, Agent, or Firm*—Oliff & Berridge, PLC (57) ABSTRACT

A tire burst predicting device which can predict occurrence of bursting of a tire and gives an alarm properly is provided. A break point frequency is estimated on the basis of time series data of wheel speed detected at a wheel speed sensor from frequency response of a first order model to which a transmission characteristic from a road surface disturbance to a wheel speed is approximated. A braking force gradient corresponding to the estimated break point frequency is estimated, on the basis of a map, which is prestored, representing a relationship between break point frequencies and braking force gradients. Extra high frequency components are eliminated from the estimated braking force gradient by a low pass filter to reduce estimation dispersion. Differentiators detect changing speed of the braking force gradient. An alarm is given when there is a possibility of bursting of tire when the detected changing speed reaches or exceeds a predetermined threshold value.

7 Claims, 9 Drawing Sheets

U.S. PATENT DOCUMENTS

| | | | |
|---|---|---|---|
| 6,377,885 B1 * | 4/2002 | Yasui et al. | 701/80 |
| 6,385,553 B1 * | 5/2002 | Naito et al. | 702/138 |
| 6,504,475 B1 * | 1/2003 | Sugisawa | 340/444 |
| 6,584,427 B1 * | 6/2003 | Kamiya et al. | 702/140 |
| 6,640,623 B1 * | 11/2003 | Ono et al. | 73/146 |
| 6,668,637 B1 * | 12/2003 | Ono et al. | 73/146.5 |
| 6,696,934 B1 * | 2/2004 | Sugisawa | 340/442 |
| 6,711,505 B1 | 3/2004 | Nakao | |
| 6,744,355 B1 * | 6/2004 | Kogure et al. | 340/442 |
| 2002/0105419 A1 * | 8/2002 | Sugisawa | 340/442 |
| 2002/0162389 A1 | 11/2002 | Yokota et al. | |
| 2003/0080863 A1 * | 5/2003 | Oshiro et al. | 340/443 |
| 2003/0192375 A1 * | 10/2003 | Sugai et al. | 73/146 |
| 2004/0046650 A1 * | 3/2004 | Yanase | 340/444 |

FOREIGN PATENT DOCUMENTS

| | | |
|---|---|---|
| JP | A 8-2221 | 1/1996 |
| JP | A 8-132831 | 5/1996 |
| JP | A 8-219920 | 8/1996 |
| JP | B2 2836652 | 10/1998 |
| JP | A 2000-55790 | 2/2000 |
| JP | A 2000-89824 | 3/2000 |
| JP | A 2001-108579 | 4/2001 |
| JP | A 2001-133390 | 5/2001 |

* cited by examiner

FREQUENCY RESPONSE TO WHEEL SPEED FROM ROAD SURFACE DISTURBANCES (BRAKING FORCE GRADIENT = 300 TO 10,000 NS/M)

TIRE BURST PREDICTION DEVICE

TECHNICAL FIELD

The present invention relates to a tire burst predicting device, and particularly relates to a tire burst predicting device which detects a ground contact state of a tire and predicts occurrence of bursting of the tire.

PRIOR TECHNOLOGY

What is called a burst, by which a tire is cut, may occur due to deflection being generated on the tire (standing wave phenomenon) and a temperature of the tire increasing when a vehicle travels at high speed in a state in which an air pressure of the tire is low.

In order to prevent bursting of the tire, technologies have been proposed in which an air pressure of a tire during traveling is detected by an air pressure sensor or an air pressure of a tire is estimated from detected wheel speed of the tire, and an alarm is given in a case in which the detected or estimated air pressure has been lowered.

For example, in Japanese Patent Application Laid-Open (JP-A) No. 7-149123, a device is disclosed, in which a wheel speed of a tire is detected by a wheel speed sensor, lowering of an air pressure of the tire is judged from the detected wheel speed, and an alarm is given in a case in which it has been judged several times that air pressure has been lowered.

PROBLEMS TO BE SOLVED BY THE INVENTION

However, there are cases in which proper air pressures for respective tires are different. Accordingly, an alarm may be incorrectly given in a case in which proper air pressure is changed due to tire changing or tire wear. Further, there is a problem in that a timing of giving an alarm may be late or early depending on states of a road and a tire or running conditions.

Further, there is a problem in that, there are cases in which it is impossible to exactly predict a burst and give an alarm by a tire air pressure alarming alone, because there are cases in which bursting of a tire occurs when a vehicle runs under conditions outside of an allowable range, such as when, the vehicle runs at high speed on a road surface of extremely high temperature, even if the air pressure is proper.

DISCLOSURE OF THE INVENTION

The present invention has been achieved to solve the above-described problems, and has an object thereof to provide a tire burst predicting device which can predict occurrence of bursting of a tire and gives an alarm with accuracy.

In order to achieve the object mentioned above, the invention of claim 1 is a tire burst predicting device comprising wheel speed detecting means which detects a speed of a wheel, ground contact state estimating means which estimates a physical quantity representing a ground contact state between the wheel and a road surface on the basis of the detected wheel speed, rate of change detecting means which detects a rate of change of the estimated physical quantity representing the ground contact state between the wheel and the road surface, and predicting means which predicts occurrence of bursting of the wheel by judging whether or not the detected rate of change is a value outside of a predetermined range.

According to the invention, the wheel speed detecting means detects a wheel speed of a vehicle (for example, a four-wheel vehicle). For example, wheel speed sensors, which generate pulses (wheel speed pulses) of a predetermined number for every one rotation of a wheel, are provided at respective wheels, and the wheel speed can be detected from a counted value or a measured value of a pulse width, in unit time, of a wheel speed pulse outputted from the wheel speed sensor.

The ground contact state estimating means estimates a physical quantity representing a ground contact state between a wheel and a road surface, such as, a physical quantity representing a ground contact area between the wheel (the tire) and the road surface, or a friction state (slipperiness) between the wheel and the road surface, on the basis of the detected wheel speed. The physical quantity representing the friction state between the wheel and the road surface is, for example, a braking force gradient. The ground contact state of the wheel can indirectly be ascertained by estimating the braking force gradient. The braking force gradient can be estimated from an estimated break point frequency. The break point frequency is estimated on the basis of time series data of the wheel speed from a frequency response of a first order lag model in which transmission characteristics from road surface disturbance to wheel speed are approximated, for example. Further, besides the braking force gradient, a driving force gradient when a driving force is applied to the wheel and a road surface $\mu$-gradient which represents a gripping state of wheel are both physical quantities representing slipperiness between the wheel and the road surface. These are physical quantities equivalent to the braking force gradient. Therefore, the driving force gradient or the road surface $\mu$-gradient can be used instead of the braking force gradient.

The rate of change detecting means detects a rate of change of the estimated physical quantity representing the ground contact state between the wheel and the road surface. That is, the rate of change detecting means detects a quantity of change of the physical quantity, in unit time, representing the ground contact state. Change of a state of the wheel can be ascertained by detecting the rate of change in this way. That is, in a case in which the braking force gradient is estimated as the physical quantity representing the ground contact state, it can be judged that there is a possibility that the tire will burst when the physical quantity representing the ground contact state changes rapidly due to the ground contact area of the wheel increasing as a result of a change in temperature of the wheel or the like, and the estimated braking force gradient rapidly increasing or decreasing.

Then, the predicting means predicts occurrence of bursting of the wheel by judging whether or not the detected rate of change is a value outside of a predetermined range. By this, it can be judged that there is a possibility of occurrence of bursting when the detected rate of change is a value outside of the predetermined range.

Note that it can be judged that there is a possibility of occurrence of bursting when a state in which the detected rate of change is a value outside of the predetermined range continues for a predetermined period or longer.

In this way, because it is judged whether or not there is a possibility that the wheel will burst from the rate of change of the physical quantity representing the ground contact state, a degree of danger of a burst can be detected with accuracy even in a case in which wheels having different characteristics are mounted or a road surface or driving conditions are extremely changed. Further, bursting can be predicted properly even in a state in which there is a possibility of occurrence of bursting of the tire even though an air pressure is appropriate, that is, for example, a state in which the vehicle runs at high speed on a road surface of extremely high temperature.

Moreover, there is a problem in that tread peeling or the like occurs due to tread heating depending on the tire. However, in this case as well, the rate of change of the physical quantity representing the ground contact state becomes a value outside of the predetermined range, and it is therefore possible to prevent an accident by predicting danger.

The alarming means can give an alarm by, for example, sounding an alarm or displaying on displaying means, in a case in which the detected rate of change is a value outside of the predetermined range. As a result, a driver of the vehicle can easily be made to recognize that there is a possibility that the wheel will burst, and can be prompted to suppress the speed of the vehicle.

Instead of the alarming, or as well as the alarming, it is possible that driving force suppressing means suppresses a driving force of the wheel in a case in which the detected rate of change is a value outside of the predetermined range. As a result, the speed of the vehicle can be suppressed and bursting of the wheel can be prevented.

Further, the ground contact state estimating means can be structured by smoothing means which smoothes the physical quantity representing the ground contact state, and a differentiator which differentiates the smoothed physical quantity representing the ground contact state. For example, a low pass filter can be used as the smoothing means. In this way, by smoothing and differentiating the physical quantity representing the ground contact state, extra high frequency components are eliminated, and it is possible to detect only change in the physical quantity representing the ground contact state generated, for example, due to change in wheel temperature.

BEST MODES FOR IMPLEMENTING THE INVENTION

[A First Embodiment]

A first embodiment of the present invention will be described hereinafter. First, a principle, in which a gradient of braking force, as a physical quantity representing a ground contact state of a tire, is estimated, will be described.

Figure 1:
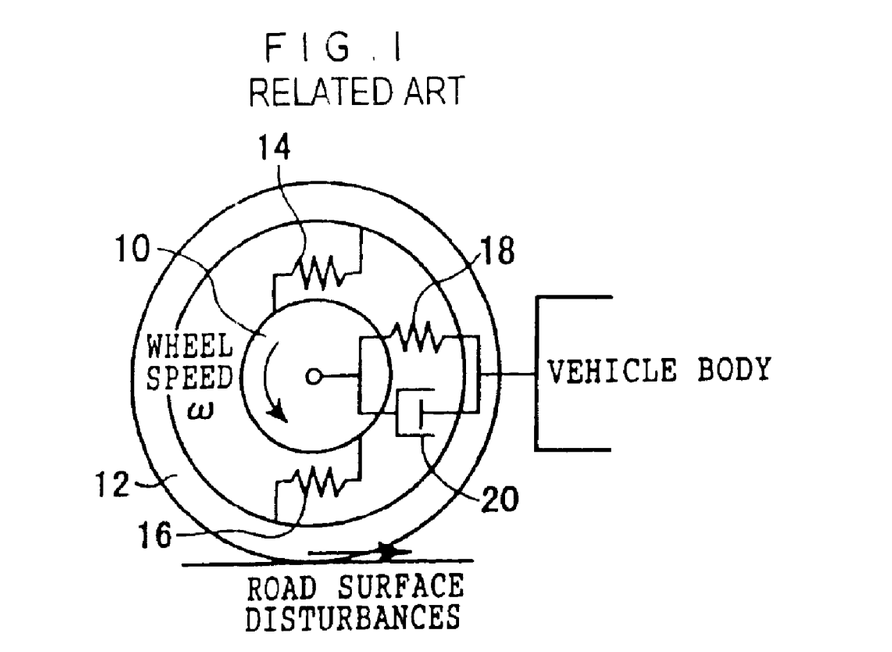
FIG. 1 is a block diagram showing a dynamic model of a wheel resonance system of embodiments of the present invention.

As shown in FIG. 1, a dynamic model of a wheel resonance system can be represented by a model in which torsional spring elements 14 and 16 of a tire, having respective spring constants K1 and K2, are interposed between a rim 10 and a belt 12 and in which a suspension, provided by connecting a spring element 18 having a spring constant K3 in parallel with a damper 20, is interposed between the rim 10 and a vehicle body. In this model, a disturbance from the road surface (road surface disturbance) is transmitted from the belt 12 through the spring elements 14 and 16 to the rim 10, to affect a wheel speed $\omega$, and is transmitted to the vehicle body through the suspension element.

Figure 2:
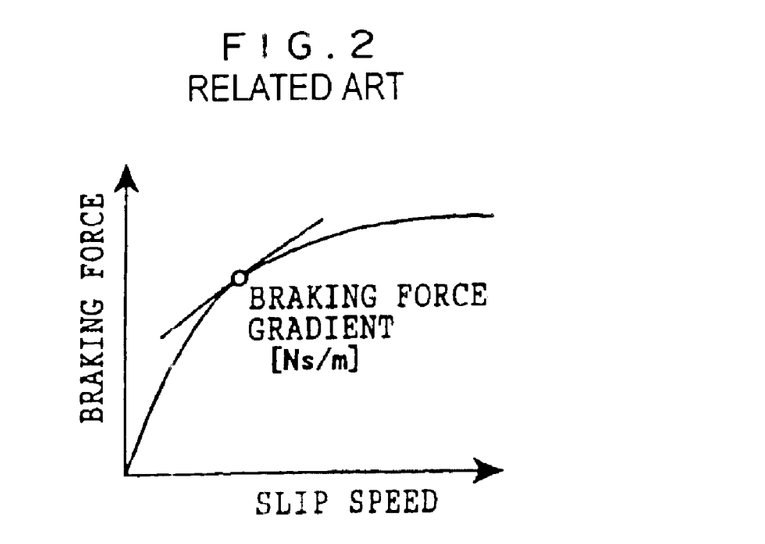
FIG. 2 is a diagram showing a relationship between a slip speed and a road surface $\mu$.

A description is now given of a relationship between the braking force gradient and a wheel speed frequency characteristic quantity representing a following frequency of characteristics of transmission from the road surface disturbance to the wheel speed, using a fifth order full wheel model, in which a first order wheel decelerating motion, a second order longitudinal direction suspension resonance, and a second order tire rotation resonance are integrated. As shown in FIG. 2, the braking force gradient is represented by a gradient (a slope) of a tangent of a curve representing a relationship between a slip speed (or a slip rate) and the braking force.

Figure 3:
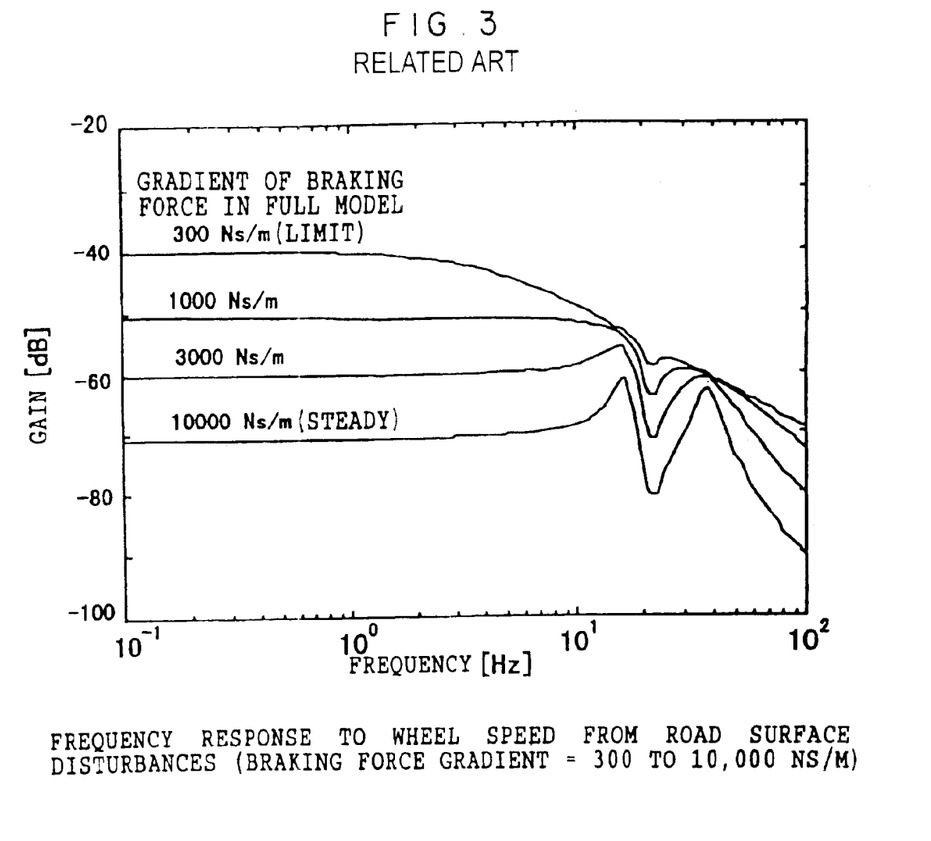
FIG. 3 is a gain diagram showing frequency responses from road surface disturbances to wheel speed.

FIG. 3 is a gain diagram showing frequency responses from road surface disturbance to the wheel speed for ranges from a limit braking range to a low slip range where there is some margin for tire characteristics, namely, for ranges from a range at which the braking force gradient is 300 Ns/m to a range at which the braking force gradient is 10000 Ns/m. That is, the diagram shows the relationship between frequency and gain of amplitude of the wheel speed with respect to amplitude of the road surface disturbance.

In FIG. 3, the frequency characteristics of the wheel speed indicate that, in a case in which the braking force gradient is relatively small, such as near the limit of friction between the tire and the road, the gain is large in a low frequency range and the gain is small in a high frequency range. Namely, for the range where the braking force gradient is relatively small, there is a big difference between the gain in the low frequency range and the gain in the high frequency range, the difference representing the wheel speed frequency characteristic quantity.

In contrast, the gain in the low frequency range for the range where the braking force gradient is relatively large, such as at a time of stationary traveling, is much smaller compared to the gain in the low frequency range for the range where the braking force gradient is relatively small, in the wheel speed frequency characteristics. On the other hand, in the high frequency range, the gain for the range where the braking force gradient is relatively large is not much smaller than the gain for the range where the braking force gradient is relatively small because of the influence of generation of rotational resonance of the tire (near 40 Hz) and the like. As the results, for the range where the braking force gradient is relatively large, the wheel speed frequency characteristic quantity is small. In the similar way, a wheel speed frequency characteristic quantity representing a difference between a vibration level of a wheel speed signal in the low frequency range and a vibration level of a wheel speed signal in the high frequency range changes similarly to the wheel speed frequency characteristic quantity representing difference between the gain in the low frequency range and the gain in the high frequency range, mentioned above.

It is apparent from the above that the wheel speed frequency characteristic quantity representing the difference (or a ratio) between the gain in the low frequency range and the gain in the high frequency range, or the difference (or a ratio) between the wheel speed signal vibration level in the low frequency range and the wheel speed signal vibration level in the high frequency range decreases as the braking force gradient increases. Utilizing this property, the braking force gradient can be estimated from the wheel frequency speed characteristic quantity.

Noting to the frequency band near 40 Hz in FIG. 3 at which rotational resonance of the tire occurs, the greater the braking force gradient, the sharper the peak resonance waveform of rotational resonance of the tire. Further, as the braking force gradient becomes greater, the overall frequency characteristics (the overall waveform) of the peak resonance waveform of rotational resonance of the tire moves to higher frequency side.

Figure 6:
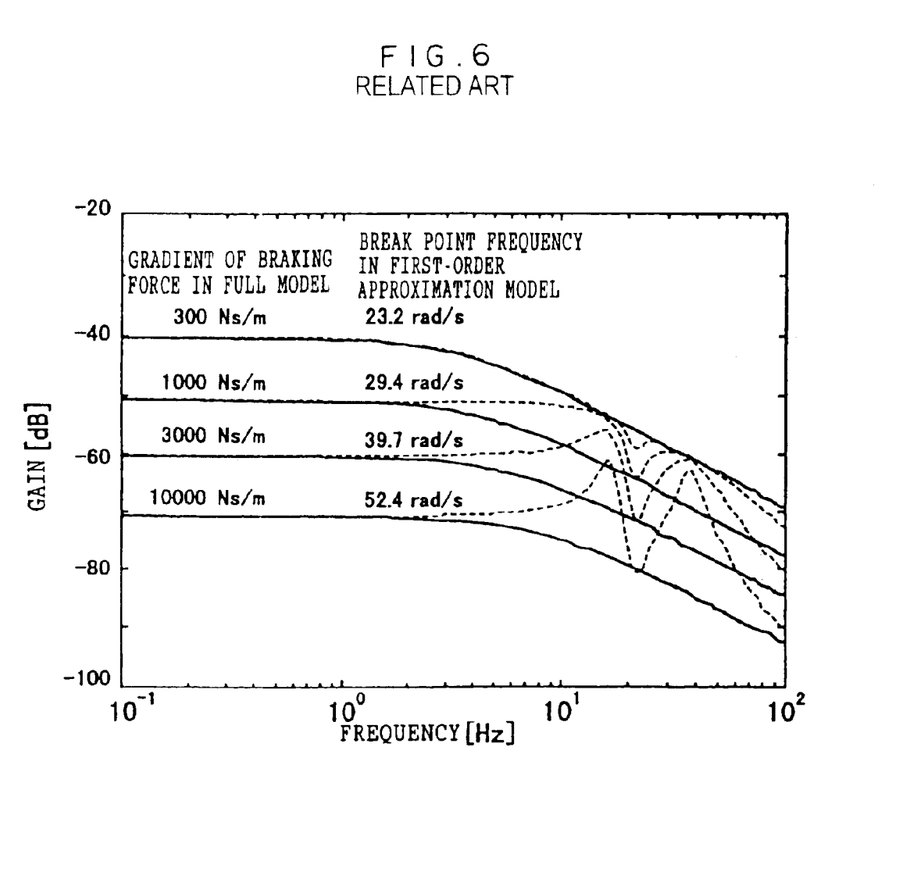
FIG. 6 is a gain diagram showing frequency responses from road surface disturbances to wheel speed in a first-order lag model.

Namely, if the wheel characteristics are approximated by a first-order lag model, it can be understood that a break point frequency becomes higher as the braking force gradient becomes larger, as shown in FIG. 6. It is therefore possible to estimate the braking force gradient from a value of the wheel speed frequency characteristic quantity representing following frequency of transmission characteristics from the road disturbance to the wheel speed, by approximating the characteristics of the wheel with a first-order lag model and estimating the break point frequency, which is a frequency at which the gain changes from a value in a predetermined range to a value out of the predetermined range, as the wheel speed frequency characteristic quantity. Lag models of the second and third orders and the like have characteristics substantially similar to those of the first-order lag model. Therefore, it is possible to estimate the braking force gradient from the value of the wheel speed frequency characteristic quantity, by approximating wheel characteristics with the lower order lag model and estimating the wheel speed frequency characteristic quantity thereof.

As well as the braking force gradient in which the braking force is applied to the tire, a driving force gradient in which the driving force is applied to the tire are all physical quantities representing slipperiness between the tire and the road surface, and are physical quantities which are equivalent to a road surface $\mu$-gradient representing a grip state of the tire. Accordingly, one of the braking force gradient, which is the gradient of the tangent of the curve representing the relationship between the slip speed or the slip rate and the braking force, the driving force gradient, which is a gradient of a tangent of a curve representing a relationship between a slip speed or a slip rate and a driving force, and the road surface $\mu$-gradient, which is a gradient of a tangent of a curve representing a relationship between a slip speed or a slip rate and a road surface $\mu$, can be estimated as the physical quantity representing slipperiness of road surface, from wheel speed frequency characteristic quantity.

The first embodiment will be described hereinafter, in which the break point frequency is estimated as the wheel speed frequency characteristic quantity, the braking force gradient is estimated as the physical quantity representing ground contact state from the estimated break point frequency, and occurrence of bursting of a tire is judged on the basis of the estimated braking force gradient.

Figure 4:
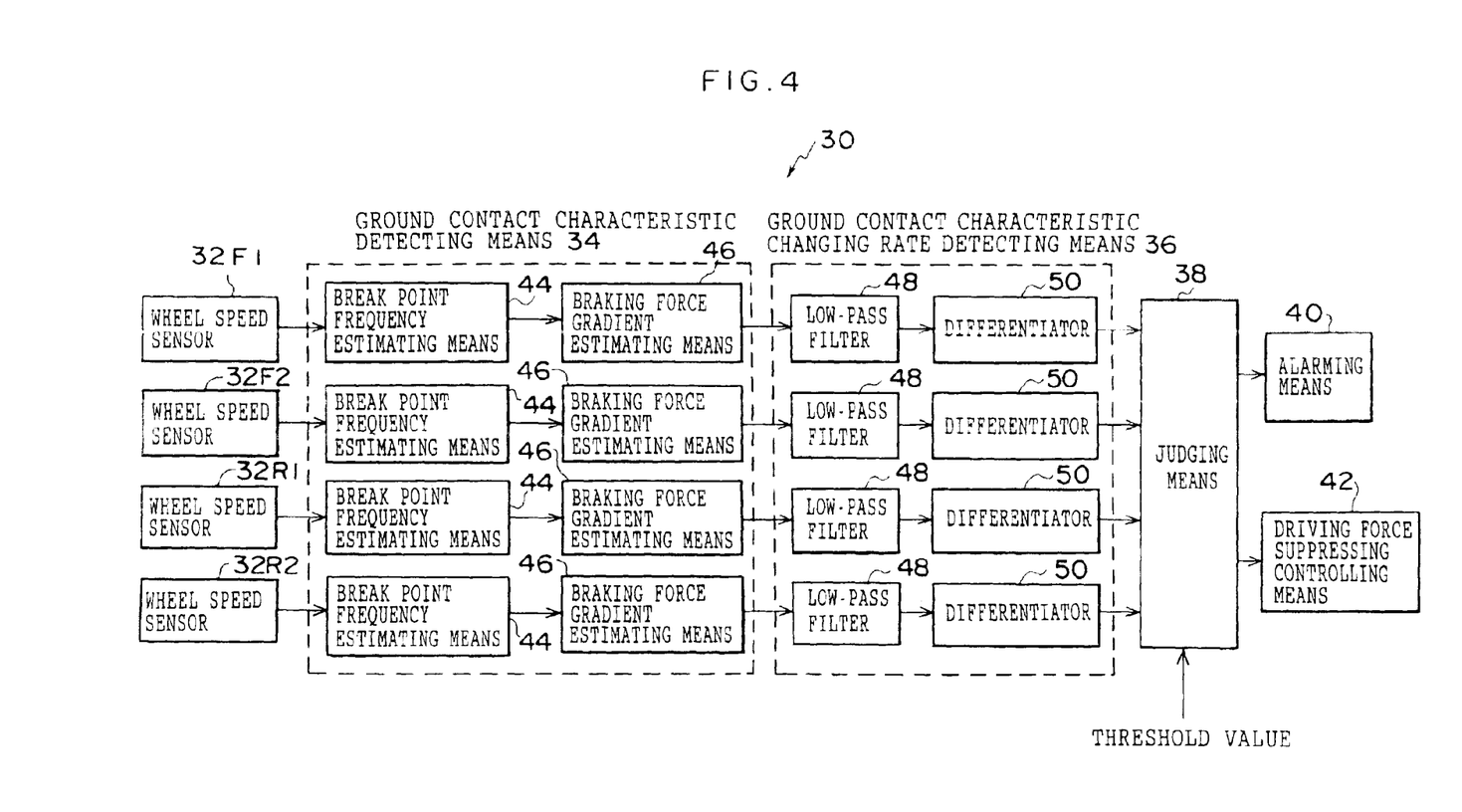
FIG. 4 is a schematic block diagram of a tire bust predicting device of the embodiment of the present invention.

As shown in FIG. 4, a tire burst predicting device 30 includes wheel speed sensors as wheel speed detecting means 32F1, 32F2, 32R1, 32R2, ground contact state detecting means as ground contact state estimating means 34, ground contact state rate of change detecting means as rate of change detecting means 36, judging means 38, alarming means 40 and driving force suppressing control means 42. The wheel speed detecting means 32F1, 32F2, 32R1, 32R2 detect respective wheel speeds of a front-right wheel, a rear-right wheel, a front-left wheel and a rear-left wheel of a vehicle not shown in the drawing in a predetermined sampling period and output time series data of the wheel speeds as wheel speed signals. The ground contact state detecting means 34 is for indirectly detecting physical quantities representing ground contact states for respective tires, namely, physical quantities representing adhesion state between the tire and the road surface. The ground contact state rate of change detecting means 36 detects rate of changes of the detected physical quantities representing ground contact states for respective tires. The judging means judges whether or not there is a possibility in which the tire will burst on the basis of the detected rate of changes of the physical quantities representing ground contact states for respective tires. The warning means 40 gives a warning, by instruction from the judging means 38, of that there is a possibility in which the tire will burst. The driving force suppressing control means 42 controls suppressing, by instruction from the judging means 38, driving force of the tire.

The wheel speed sensor 32F1 outputs a wheel speed of the front-left wheel, the wheel speed sensor 32F2 outputs a wheel speed of the front-right wheel, the wheel speed sensor 32R1 outputs a wheel speed of the rear-left wheel, the wheel speed sensor 32R2 outputs a wheel speed of the rear-right wheel. Also, as shown in FIG. 4, break point frequency estimating means 44, braking force gradient estimating means 46, low-pass filters 48 and differentiators 50 are provided at respective tires of the front-left wheel, the front-right wheel, the rear-left wheel and the rear-right wheel.

The ground contact state detecting means 34 includes, as an example, the break point frequency estimating means 44 and the braking force gradient estimating means 46. The break point frequency estimating means 44 estimates a break point frequency as a frequency at which, in a gain diagram that represents a frequency response of a model of which a transmission characteristics from road surface disturbance to wheel speed is approximated to first order lag model on the basis of time series data of the wheel speed, gain changes from a constant value (changes from a value in a predetermined range to a value out of the predetermined range). The braking force gradient estimating means 46 estimates a braking force gradient corresponding to the estimated break point frequency, on the basis of a map, which is prestored, representing a relationship between break point frequencies and the braking force gradients.

The ground contact state rate of change detecting means 36 includes, as an example, the low pass filters 48 and the differentiators 50. The low pass filters 48 are for reducing estimation variations of the estimated braking force gradients. The differentiators 50 are for detecting rate of change of the braking force gradient.

Next, the estimation of the break point frequency by the break point frequency estimating means 44 and the estimation of the braking force gradient by the braking force gradient estimating means 46 will be described.

In the break point frequency estimating means 44 of the present embodiment, a break point frequency in a first-order lag model using a least squares method is identified with an assumption that a white disturbance, that is, a disturbance including all frequencies, is inputted to the tire from the road surface.

Figure 5:
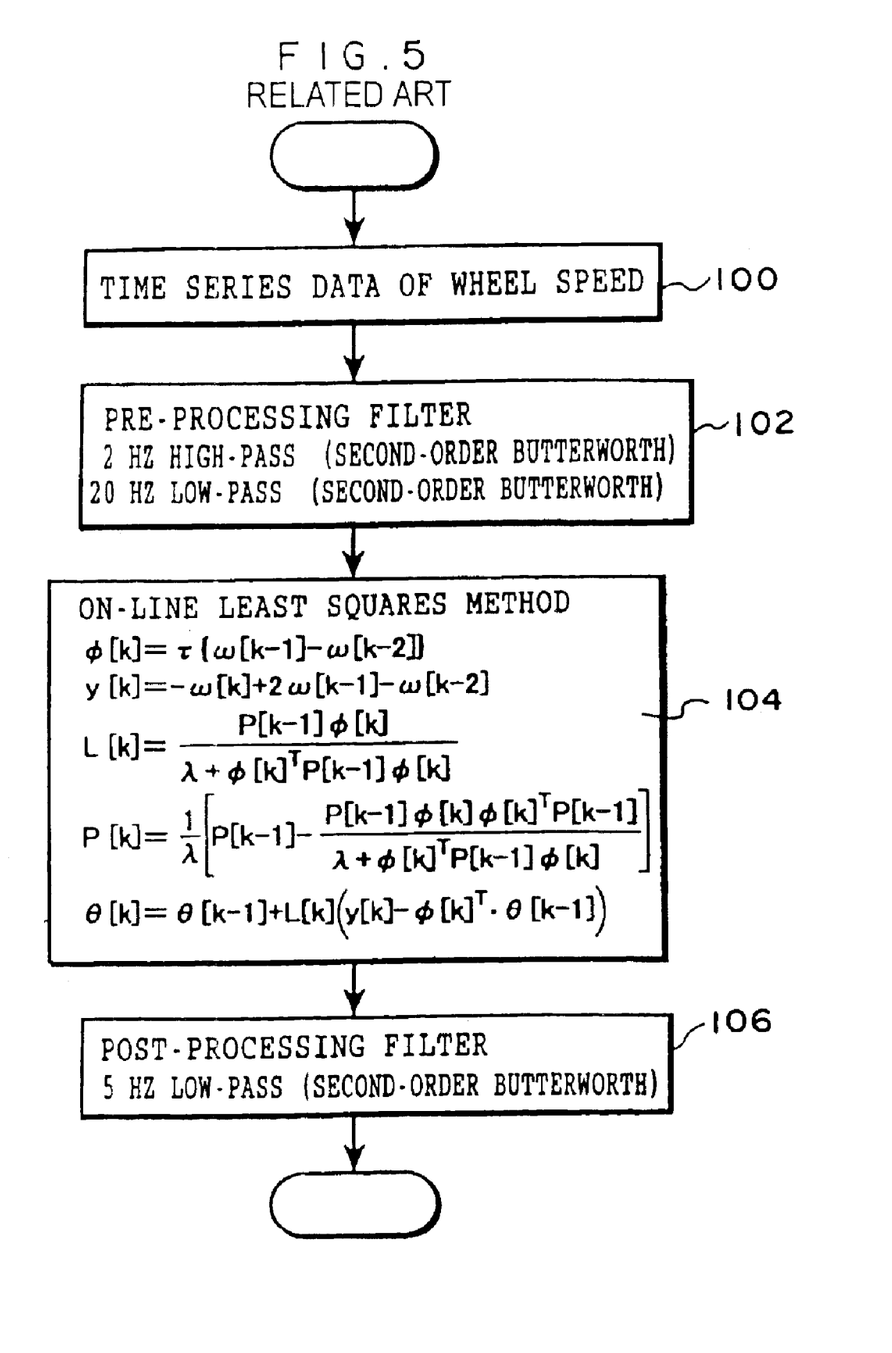
FIG. 5 is a flow chart showing algorithm for estimating a break point frequency in the embodiment of the present invention.

FIG. 5 shows an algorithm for identifying the break point frequency, and FIG. 6 is gain diagrams of first-order lag model associated with break point frequencies identified by the algorithm in FIG. 5 when a white disturbance is applied to the full wheel model in FIG. 1.

First, the algorithm for identifying the break point frequency will be described with reference to FIG. 5. At step 100, data, which is the time series data of the wheel speed detected by the wheel speed sensor 32 with white disturbance added, is acquired and then subjected to a pre-process at step 102 using a second-order Butterworth filter, by a filter having, for example, a 2 Hz high-pass filter and, for example, a 20 Hz low-pass filter. Steady components of acceleration of the wheel can be eliminated by inputting the wheel speed signal to the high-pass filter to perform high-pass filtering, and a smoothing process is performed on the wheel speed signal by the low-pass filtering.

At subsequent step 104, time series data of a break point frequency is estimated from the pre-processed time series data of the wheel speed using the on-line least squares method. First, the time series data of the wheel speed which has been detected by the wheel speed sensor 32, on a discrete basis at sampling period τ, has been subjected to the pre-process by the filter at step 102. Therefore, this time series data of the wheel speed is represented by ω[k] (k represents sampling times based on the sampling period τ as a unit and takes values 1, 2, . . . ). Then, the following steps 1 and 2 are repeated. Thus, time series data of a break point frequency is estimated from the detected time series data of the wheel speed.

[Formula 1]
Step 1:

$$\phi[k]=\tau\{\omega[k-1]-\omega[k-2]\} \quad (1)$$

$$y[k]=-\omega[k]+2\omega[k-1]-\omega[k-2] \quad (2)$$

φ[k] in Equation (1) is a value obtained by multiplying the quantity of a change in the wheel speed in one sample period by sample period τ (a physical quantity associated with a change in the wheel speed), and y[k] (a physical quantity associated with a change in a change in the wheel speed, namely, a physical quantity associated with a change in a wheel acceleration) in Equation (2) is a quantity of change in one sample period (ω[k−1]−ω[k−2]−(ω[k]−ω[k−1])) in changes in the wheel speed in one sample period (ω[k−1]− ω[k−2], ω[k]−ω[k−1]).

[Formula 2]
Step 2:

$$\theta[k]=\theta[k-1]+L[k] \ (y[k]-\phi[k]^T \cdot \theta[k-1]) \quad (3)$$

Here, $$L[k] = \frac{P[k-1]\phi[k]}{\lambda + \phi[k]^T P[k-1]\phi[k]} \quad (4)$$

$$P[k] = \frac{1}{\lambda}\left[P[k-1] - \frac{P[k-1]\phi[k]\phi[k]^T P[k-1]}{\lambda + \phi[k]^T P[k-1]\phi[k]}\right] \quad (5)$$

An estimated value θ, i.e., a break point frequency, is estimated from the above recurrence formulae. λ in Equations (4) and (5) represents a forgetting coefficient which indicates the degree of elimination of previous data (for example, λ=0.98), and T represents transposition of a matrix.

θ[k] in Equation (3) is a physical quantity representing history of physical quantity associated with the change in the wheel speed and history of physical quantity associated with the change in the change in the wheel speed, i.e., the change in the wheel acceleration.

While an example of estimation of the break point frequency using the on-line least squares method has been described above, the break point frequency can be estimated using other on-line methods, such as the instrumental variable method and the like.

FIG. 6 shows example of result of estimation of the break point frequency in first-order lag model, estimated as described above. As will be understood from the gain diagram in FIG. 6, each gain of an approximated first-order lag model is identified as a characteristics that passes through a gain at an antiresonant point (near 40 Hz) and steady gain in a full wheel model gain diagram for each braking force gradient other than 300 Ns/m. Suspension longitudinal direction resonance near 15 Hz and resonance characteristics of rotational vibration of the tire near 40 Hz are ignored as a result of use of the lower order model. When a braking force gradient is small such as 300 Ns/m, no resonance is observed because no antiresonant point is passed in the first-order lag model, which indicates that the vibration characteristics of the first-order lag model and the characteristics of the full wheel model agree with each other well. The reason for this is that a wheel deceleration motion model is dominant in a braking region near the limit, where the braking force gradient is 300 Ns/m or less, because there is less influence of suspension longitudinal direction resonance or resonance of rotational vibration of the tire. It is therefore considered that motion of the wheel can be approximated by the following wheel deceleration motion model in this region near the limit.

[Formula 3]

$$\dot{v}_w = -kR_C^2/J \ \dot{v}_w + w \quad (6)$$

where $v_w$ represents a wheel speed (m/s); w represents a road surface disturbance; k represents a braking force gradient (Ns/m); $R_C$ represents an effective radius of the tire (m); J represents moment of inertia of a vehicle; and a coefficient of $v_w$ represents the break point frequency.

Equation (6) indicates that the following relationship exists between a break point frequency $\omega_0$ and a braking force gradient in the limit region.

[Formula 4]

[Formula 4]

$$\omega_0 = \frac{kR_c^2}{J} \quad (7)$$

Figure 7:
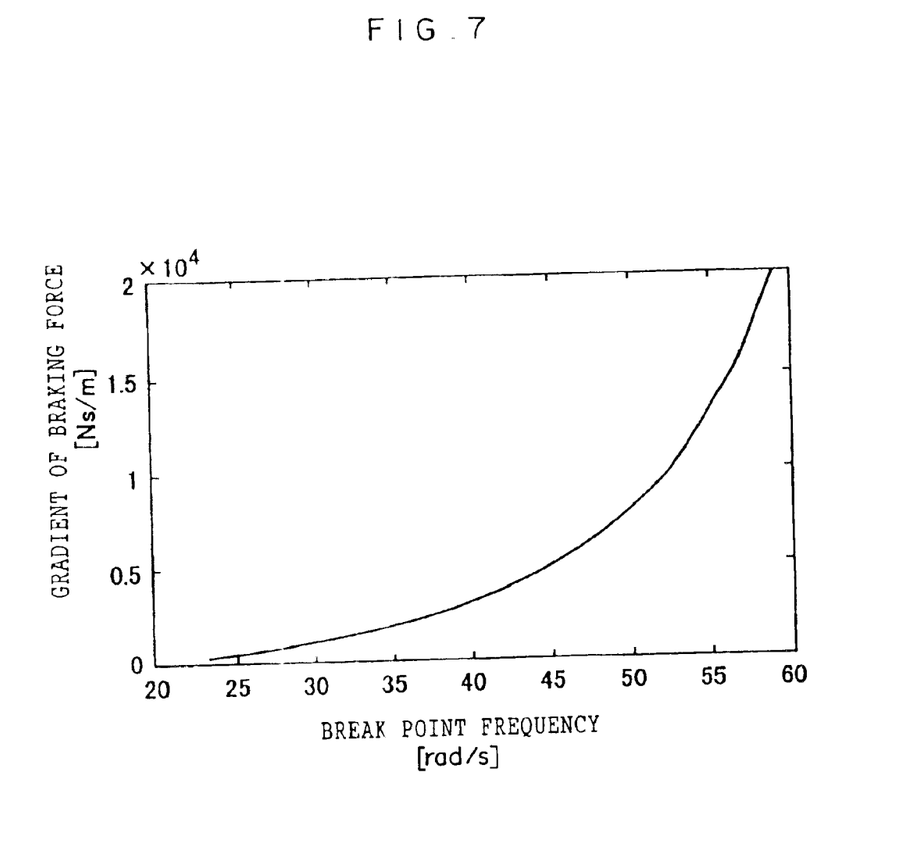
FIG. 7 is a diagram showing a relationship between break point frequency and braking force gradient.

In a low slip region, a relationship shown in FIG. 7 can be derived by using a least squares method. FIG. 7 shows the relationship between braking force gradients in the full wheel model and break point frequencies identified from wheel speed data with white disturbance being added. The unit of the break point frequencies in FIG. 7 is represented [rad/s]. The braking force gradient monotonously increases as the break point frequency increases. It is therefore possible to estimate the braking force gradient by estimating (identification) result of the break point frequency by that the relationship between braking force gradients and break point frequencies shown in FIG. 7 is stored as a map in a memory of the braking force gradient estimating means 46, and the braking force gradient corresponding the break point frequency estimated by the break point frequency estimating means 44 on the basis of the wheel speed signal by using the map is calculated.

Extra high frequency component is eliminated from the estimated braking force gradient of each tire by the low pass filter 48 to smooth the braking force gradient. The braking force gradient is outputted to the differentiator 50. In the differentiator 50, the braking force gradient is differentiated, and a rate of change of the braking force gradient, that is, a changing quantity of the braking force gradient in an unit time, is outputted to the judging means 38.

Because the rate of change of the braking force gradient is detected by that the estimated braking force gradient is smoothed by the low pass filter 48 and is differentiated by the differentiator 50 in this way, change in tire characteristic due to change of temperature of a tire tread, that is, change of the braking force gradient in time only can be detected.

Next, control routine executed by the judging means 38 will be explained. In step 202 shown in FIG. 8, the judging means 38 inputs the rate of change of the braking force gradient of each tire.

Figure 8:
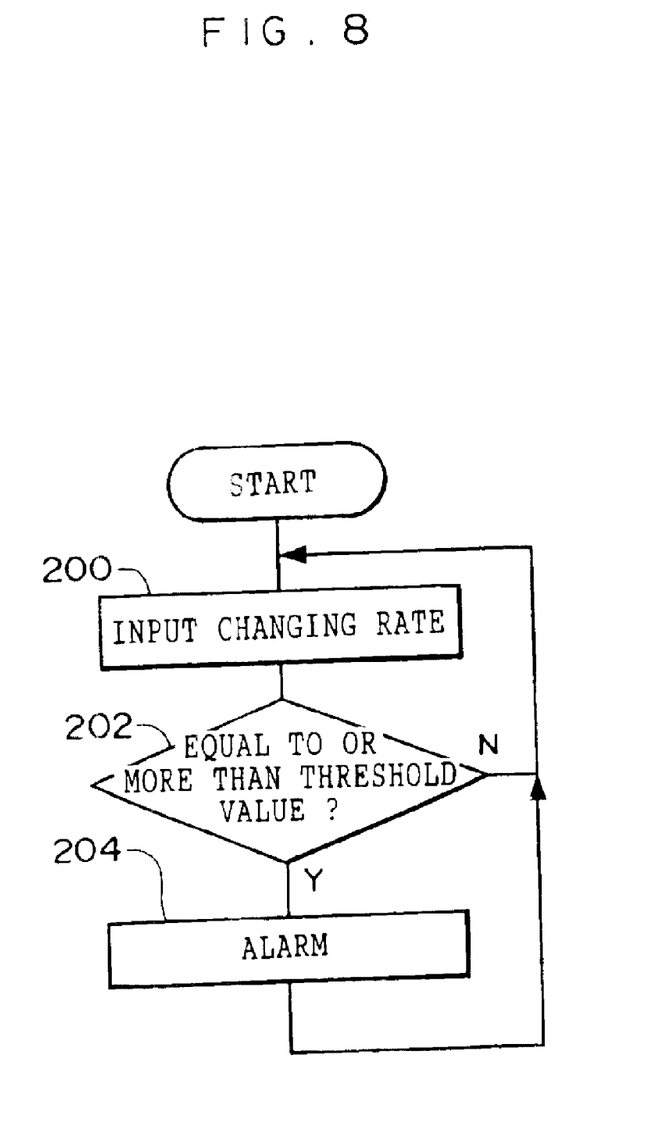
FIG. 8 is a flow chart of control routine executed by judging means.

Then, in step 202, it is each compared whether or not the inputted rate of change of the braking force gradient of each tire is equal to or more than a predetermined threshold value. That is, it is judged whether or not the braking force gradient becomes large or small rapidly with a speed more than or equal to a predetermined speed. The threshold value is set as a value of which, for example, there is a possibility of occurrence of bursting if the rate of change becomes larger than the value.

If any one of the rate of changes of the braking force gradients of respective tires is equal to or more than the predetermined threshold value, the alarming means 40 alarms of that there is a possibility of occurrence of bursting of the tire, and urges a driver to stop driving. A case in which the rate of change of the braking force gradient of the tire becomes equal to or more than the predetermined threshold value is, for example, a case in which the braking force gradient becomes rapidly larger or small due to that the temperature of the tire increases and a contact area between the tire and the road surface becomes large. In this case, it can be judged that there is a high possibility that the tire will burst.

The alarm may be given by, for example, an alarm sound, or by displaying a position of the tire of which the rate of change of the braking force gradient is equal to or more than the predetermined threshold value on a display panel. Also, the alarm may be given by combination of both cases.

Instead of alarming, or as well as alarming, it is possible that speed or driving force of the vehicle is suppressed by the driving force suppressing control means 42. By this, burst of tire can be prevented.

The same predetermined threshold value may be set for each tire. Alternatively, because each durability against burst of the respective tires are different depending on abrasion states of the tires, different threshold values may be set for the respective tires in accordance with respective abrasion states of the tires. Also, because durability against burst of tire becomes different in accordance with a type of tire, the threshold value may be set in accordance with mounted tire.

Also, a difference between the rate of changes of the braking force gradients of the right wheel and the left wheel, to be concretely, a difference between an output of the differentiator 50 corresponding to the wheel speed sensor 32F1 and an output of the differentiator 50 corresponding to the wheel speed sensor 32F2 and a difference between an output of the differentiator 50 corresponding to the wheel speed sensor 32R1 and an output of the differentiator 50 corresponding to the wheel speed sensor 32R2, can be obtained, and the alarm can be given when the difference is equal to or more than a predetermined threshold value, that is, when the difference between the rate of change of the braking force gradient of the right wheel and the rate of change of the braking force gradient of the left wheel is greatly different. Also, in the similar way, a difference between the rate of changes of the braking force gradients of the front wheel and the rear wheel, to be concretely, a difference between an output of the differentiator 50 corresponding to the wheel speed sensor 32F1 and an output of the differentiator 50 corresponding to the wheel speed sensor 32R1 and a difference between an output of the differentiator 50 corresponding to the wheel speed sensor 32F2 and an output of the differentiator 50 corresponding to the wheel speed sensor 32R2, can be obtained, and the alarm can be given when the difference is equal to or more than a predetermined threshold value, that is, when the difference between the rate of change of the braking force gradient of the front wheel and the rate of change of the braking force gradient of the rear wheel is greatly different.

In this way, the alarm can be given appropriately without being affected by change of the braking force gradient caused by disturbances such as a road surface state or an attitude of vehicle, by judging whether or not there is a possibility of occurrence of bursting by obtaining the difference between the rate of changes of the braking force gradients of the right wheel and the left wheel and/or the difference between the rate of changes of the braking force gradients of the front wheel and the rear wheel. Further, robust can be improved by synthetically judging whether or not there is a possibility of occurrence of bursting by determining the rate of change of the braking force gradient of each tire, the difference between the rate of changes of the braking force gradients of the front wheel and the rear wheel, and the difference between the rate of changes of the braking force gradients of the right wheel and the left wheel.

Further, a difference between the braking force gradients of the right wheel and the left wheel or a difference between the braking force gradients of the front wheel and the rear wheel, instead of the difference between the rate of changes of the braking force gradients of the right wheel and the left wheel or the difference between the rate of changes of the braking force gradients of the front wheel and the rear wheel, can be obtained, and a rate of change of the difference can be obtained. Then, it can be judged whether or not the rate of change of the difference is equal to or more than a predetermined threshold value, and the alarm can be given when the difference is equal to or more than the predetermined threshold value.

Figure 9:
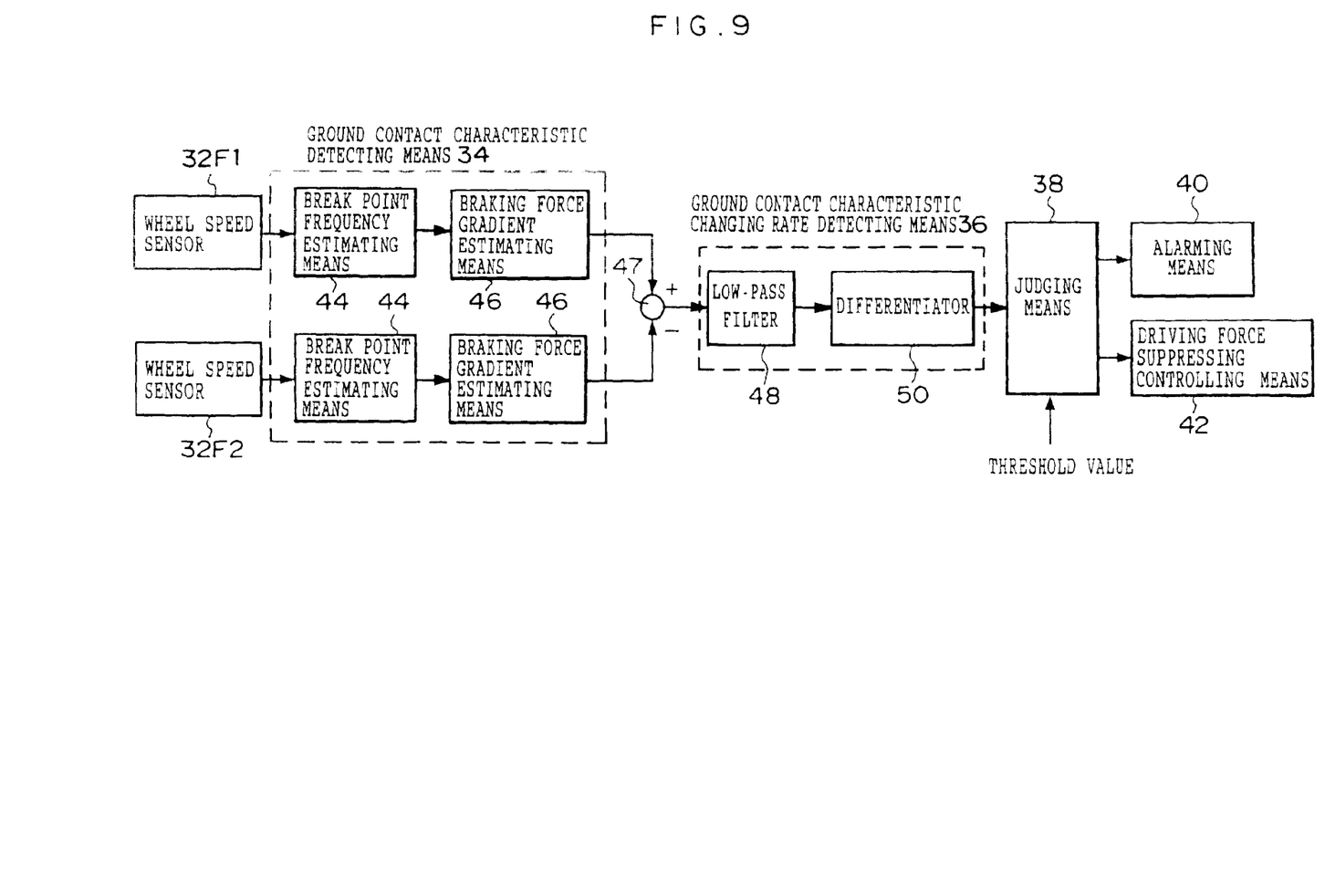
FIG. 9 is a schematic block diagram of a tire bust predicting device of another example.

To be concretely, as shown in FIG. 9, for a case of alarming of that there is a possibility of occurrence of bursting of one of the left and the right tires, a subtraction circuit 47 calculates a difference between a braking force gradient of the left-front wheel estimated by the braking force gradient estimating means 46 corresponding to the wheel speed sensor 32F1 and a braking force gradient of the right-front wheel estimated by the braking force gradient estimating means 46 corresponding to the wheel speed sensor 32F2. A rate of change of the difference is detected by the ground contact state rate of change detecting means 36. The alarm can be performed by the alarm means 40 when the difference outputted from the ground contact state rate of change detecting means 36 is equal to or more than the predetermined threshold value by the judging means 38. Note that, for a case of alarming of that there is a possibility of occurrence of bursting of one of the front and rear tires, the alarm can be given by a structure similar to the structure mentioned above.

In this way, because it is judged whether or not there is a possibility of occurrence of bursting of the tire from the rate of change of the braking force gradient of the tire, a critical state of burst can be properly detected without being affected by offset or change in sensitivity even when tires having different characteristics are mounted or a road surface or driving condition is extremely changed. In other words, the critical state of burst can be accurately detected without the need for compensating offset or change in sensitivity in accordance with difference of the tires, the road surface or driving condition.

Further, the alarm can be properly given even in a state in which there is a possibility of occurrence of bursting of the tire even though an air pressure is appropriate, that is, for example, a state in which the vehicle runs at high speed on the road surface of extremely high temperature.

Further, in a case in which a tire blowouts and a tire air pressure alarming device is operated, and the vehicle run for itself to a repair shop, a secondary alarm can be given if there is a high possibility of occurrence of bursting of the tire.

It is possible that the rate of change of the braking force gradient in a normal state is stored and the threshold value is obtained by learning from the rate of change of the braking force gradients in past. This learning may be performed by learning a mean value of the rate of changes of the braking force gradients for respective tires. In this case, it is preferable that there are not large difference among the rate of changes of the braking force gradients for respective tires. It can be detected properly at an early stage that there is a high possibility of occurrence of bursting and wrong alarm or wrong operation can be prevented by learning threshold value for judging whether or not there is a possibility of occurrence of bursting in this way.

Further, in the present embodiment, the braking force gradient is obtained from estimated break point frequency and burst of the tire is judged from the rate of change of the obtained braking force gradient. However, it is possible that burst of the tire is judged directly from the break point frequency. In this case, in a case of the structure shown in FIG. 4, the braking force gradient estimating means 46 are omitted, and the break point frequency estimating means 44 are directly connected to the low-pass filters 48. By this, the break point frequency outputted from the break point frequency estimating means 44 is smoothed by the low-pass filter 48 and is outputted to the differentiator 50, and rate of change of the break point frequency is outputted from the differentiator 50. The judging means 38 judges whether or not the rate of change of the break point frequency outputted from the differentiator 50 is more than or equal to a predetermined threshold value, and the alarm is given by the alarm means 40 when the rate of change of the break point frequency is more than or equal to the predetermined threshold value.

In a case of the structure shown in FIG. 9, the braking force gradient estimating means 46 are omitted, and the break point frequency estimating means 44 are directly connected to the subtraction circuit 47. By this, a difference between the break point frequencies of the left and the right tires is calculated at the subtraction circuit 47, and the difference is outputted to the low-pass filter 48. The judging means 38 judges whether or not the rate of change of the difference of the break point frequencies outputted from the differentiator 50 is more than or equal to a predetermined threshold value, and the alarm is given by the alarm means 40 when the rate of change of the difference of the break point frequencies is more than or equal to the predetermined threshold value.

[A Second Embodiment]

Next, a second embodiment will be described. In the present embodiment, a difference between a vibration level in a low frequency range and a vibration level in a high frequency range, instead of the break point frequency, is used as the wheel speed frequency characteristic quantity. $\mu$-gradient of the road surface is estimated and it is judged whether or not there is a possibility of occurrence of bursting of the tire from the estimated $\mu$-gradient of the road surface. The same reference numerals are applied to the same sections as those of the first embodiment and the descriptions thereof are omitted.

Figure 10:
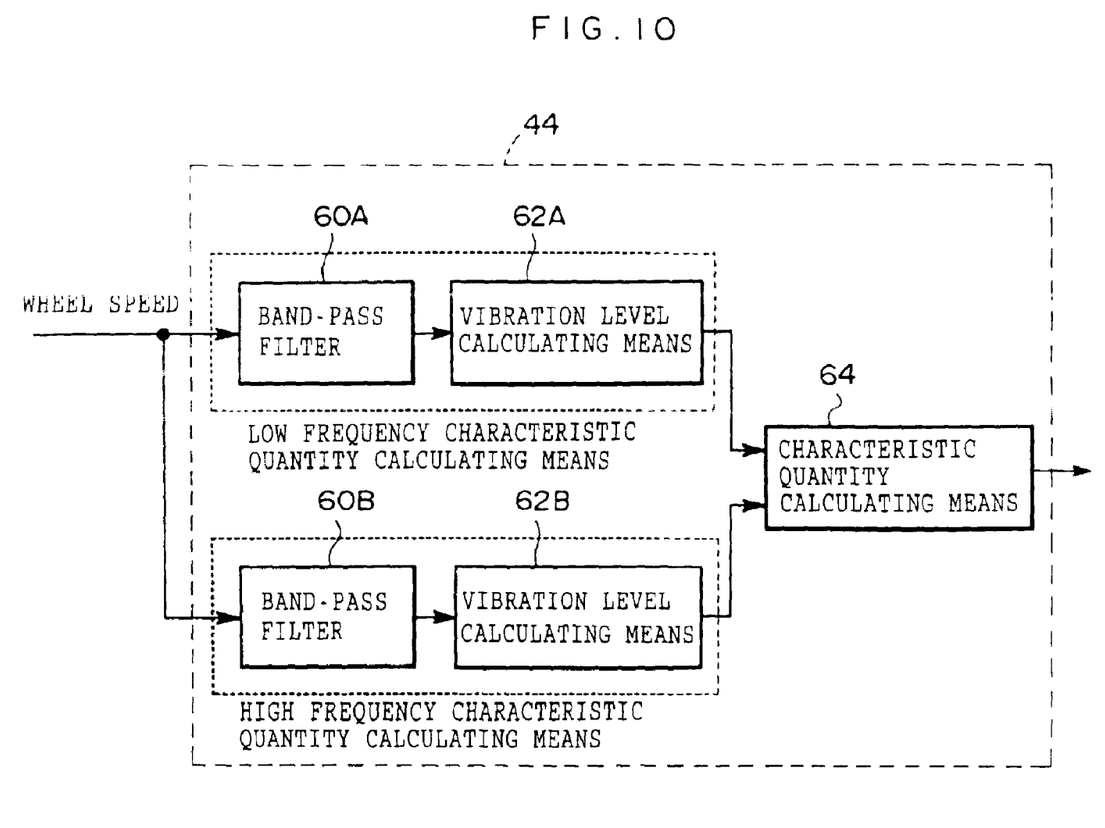
FIG. 10 is a schematic block diagram of wheel speed frequency characteristic quantity estimating means.

As shown in FIG. 10, wheel speed frequency characteristic quantity estimating means 44 corresponding to the break point frequency estimating means 44 in the first embodiment is structured by low frequency characteristic quantity calculating means including a band-pass filter 60A for extracting a wheel speed signal in a low frequency range and first vibration level calculating means 62A for calculating a vibration level from the wheel speed signal after filtering, high frequency characteristic quantity calculating means including a band-pass filter 60B for extracting a wheel speed signal in a high frequency range and second vibration level calculating means 62B for calculating a vibration level from the wheel speed signal after filtering, and characteristic quantity calculating means 64 for outputting a difference between a low frequency characteristic quantity calculated by the low frequency characteristic quantity calculating means and a high frequency characteristic quantity calculated by the high frequency characteristic quantity calculating means, to serve as the wheel speed frequency characteristic quantity. A road surface $\mu$-gradient estimating means (not shown in the drawing) corresponding to the braking force gradient estimating means 46 in the first embodiment is connected to an output of the characteristic quantity calculating means 64.

The band pass filter 60A of the low frequency characteristic quantity calculating means is set with a transmission frequency so as to transmit wheel speed signals in a region of relatively low frequency of wheel speed motion. The band pass filter in the present embodiment is set to transmit wheel speed signals at frequencies from 15 to 50 Hz. Further, the band pass filter 60B of the high frequency characteristic quantity calculating means is set with a transmission frequency so as to transmit wheel speed signals in a region of relatively high frequency of wheel speed motion. The band pass filter 60B in the present embodiment is set to transmit wheel speed signals at frequencies from 30 to 50 Hz.

The vibration level detection means 62A squares the wheel speed signal transmitted by the band pass filter 60A and represents in decibels and outputs the signal to serve as the low frequency characteristic quantity. The vibration level detection means 62B squares a wheel speed signal transmitted by the band pass filter 60B and represents in decibels and outputs the signal to serve as the high frequency characteristic quantity.

The characteristic quantity calculating means 64 outputs the difference between the low frequency characteristic quantity and the high frequency characteristic quantity to serve as the wheel speed frequency characteristic quantity.

As previously described with reference to FIG. 3, in a region where the $\mu$-gradient of the road surface (a value equivalent to the braking force gradient in FIG. 3) is relatively small, such as near the limit, the frequency characteristics of the wheel speed exhibit high gain in the low frequency range and low gain in the high frequency range. Therefore, the wheel speed frequency characteristic quantity indicating the difference between the gain in the low frequency range and the gain in the high frequency range is large. In contrast, in a region where the μ-gradient of the road surface is relatively large, such as at steady travelling, the frequency characteristics of the wheel speed signals exhibit that the gain in low frequency range is smaller than that for the region where the μ-gradient of the road surface is relatively small. In contrast, gain in high frequency range does not so much smaller compared to that for the region where the road surface μ-gradient is relatively small, for reasons such as affection by the occurrence of rotational resonance of the tire. This leads to a small wheel speed frequency characteristic quantity. Therefore, the wheel speed frequency characteristic quantity indicating the difference between the vibration level in the low frequency range and the vibration level in the high frequency range decreases as the road surface μ-gradient increases. The road surface μ-gradient is estimated from the wheel speed frequency characteristic quantity by utilizing this property.

In the road surface μ-gradient estimating means of the present embodiment, a relationship between the road surface μ-gradient and the wheel speed frequency characteristic quantity representing the difference between the vibration level in the low frequency range and the vibration level in the high frequency range is stored as a map in advance, by utilizing the property in which the wheel speed frequency characteristic quantity decreases as the road surface μ-gradient increases, and the road surface μ-gradient is estimated from the estimated wheel speed frequency characteristic quantity and the map.

In the present embodiment, it has been described that the road surface μ-gradient estimating means (not shown in the drawing) corresponding to the braking force gradient estimating means 46 in the first embodiment is connected to the output of the characteristic quantity calculating means 64. In a case of the structure shown in FIG. 4, the output of the characteristic quantity calculating means 64 is directly connected to the low-pass filters 48. In a case of the structure shown in FIG. 9, the output of the characteristic quantity calculating means 64 is directly connected to the subtraction circuit 47. Namely, it can be directly judged whether or not there is a possibility of occurrence of bursting of the tire from the estimated μ-gradient of the road surface from the wheel speed frequency characteristic quantity representing the difference between the vibration level in the low frequency range and the vibration level in the high frequency range.

[Effect of the Invention]

As described above, the present invention has an effect that the occurrence of bursting of the tire can be properly predicted.

What is claimed is:

1. A tire burst predicting device comprising:
   wheel speed detecting means which detects a speed of a wheel;
   ground contact state estimating means which estimates a physical quantity representing a ground contact state between the wheel and a road surface on the basis of the detected wheel speed;
   rate of change detecting means which detects a rate of change of the estimated physical quantity representing the ground contact state between the wheel and the road surface; and
   predicting means which predicts occurrence of bursting of the wheel by judging whether or not the detected rate of change is a value outside of a predetermined range.

2. The tire burst predicting device of claim 1 further comprising alarming means which gives an alarm relating to bursting of the wheel, wherein the predicting means judges whether or not the detected rate of change is a value outside of the predetermined range, and the alarming means gives the alarm in a case in which the detected rate of change is a value outside of the predetermined range.

3. The tire burst predicting device of claim 1 further comprising driving force suppressing means which suppresses a driving force of the wheel, wherein the predicting means judges whether or not the detected rate of change is a value outside of the predetermined range, and the driving force suppressing means suppresses the driving force of the wheel in a case in which the detected rate of change is a value outside of the predetermined range.

4. The tire burst predicting device of claim 2 further comprising driving force suppressing means which suppresses a driving force of the wheel, wherein the predicting means judges whether or not the detected rate of change is a value outside of the predetermined range, and the driving force suppressing means suppresses the driving force of the wheel in a case in which the detected rate of change is a value outside of the predetermined range.

5. The tire burst predicting device of claim 1, wherein the ground contact state estimating means comprises smoothing means which smoothes the physical quantity representing the ground contact state, and a differentiator which differentiates the smoothed physical quantity representing the ground contact state.

6. The tire burst predicting device of claim 2, wherein the ground contact state estimating means comprises smoothing means which smoothes the physical quantity representing the ground contact state, and a differentiator which differentiates the smoothed physical quantity representing the ground contact state.

7. The tire burst predicting device of claim 3, wherein the ground contact state estimating means comprises smoothing means which smoothes the physical quantity representing the ground contact state, and a differentiator which differentiates the smoothed physical quantity representing the ground contact state.

* * * * *